United States Patent [19]

Hunt et al.

[11] 3,940,147

[45] Feb. 24, 1976

[54] MODULAR DISC EJECT APPARATUS FOR USE AS AN OUTPUT HOPPER AND CARTRIDGE HOLDER IN DICTATION AND TRANSCRIPTION SYSTEMS

[75] Inventors: Ronald Eugene Hunt, Austin; William Melchior Jenkins, Leander, both of Tex.

[73] Assignee: International Business Machines Corporation, Armonk, N.Y.

[22] Filed: Mar. 17, 1975

[21] Appl. No.: 559,350

[52] U.S. Cl. .................................. 274/9 B; 360/86
[51] Int. Cl.² G11B 25/04; G11B 1/02; G11B 17/10
[58] Field of Search ........... 360/86, 97, 98, 99, 101, 360/133, 137, 135, 88, 107; 274/9 B, 39 A, 42 R; 346/137; 179/100.1 DR

[56] References Cited
UNITED STATES PATENTS

| | | | |
|---|---|---|---|
| 3,070,374 | 12/1962 | Nakamatsu | 360/101 |
| 3,662,360 | 5/1972 | Lambert | 360/97 |
| 3,789,160 | 1/1974 | Bruer | 360/86 |
| 3,846,836 | 11/1974 | Masse | 360/98 |
| 3,854,784 | 12/1974 | Hunt | 360/137 |
| 3,873,100 | 3/1975 | Omiya | 274/9 B |
| 3,891,796 | 6/1975 | Takahara | 360/133 |

*Primary Examiner*—Richard E. Aegerter
*Assistant Examiner*—A. J. Mirabito
*Attorney, Agent, or Firm*—John G. Wynn

[57] ABSTRACT

A modular design disc receiving apparatus that is utilized as a cartridge holder or output hopper. When utilized as a cartridge holder, push to latch, push to unlatch means position the cartridge for proper disc insertion, thereby readying the apparatus for its function as a cartridge holder. The apparatus comprises means for counting and giving visual indication of the number of discs ejected into the cartridge, and means for sensing a cartridge full situation, thereby enabling associated feeding systems, and, accordingly, preventing jamming of the apparatus. In addition, the apparatus is utilized as a disc output hopper, in the situation where a cartridge is not being used. When used, as aforementioned, the capacity of the apparatus is approximately doubled. Discs ejected into the apparatus are neatly stacked so that they protrude from the front of the apparatus where they can be seen and easily removed. When the apparatus is completely filled with discs, a subsequently ejected disc will be forced out of the apparatus to prevent jamming.

2 Claims, 16 Drawing Figures

MODULAR DISC EJECT APPARATUS FOR USE AS AN OUTPUT HOPPER AND CARTRIDGE HOLDER IN DICTATION AND TRANSCRIPTION SYSTEMS

BACKGROUND OF THE INVENTION

1. Field of the Invention

This invention relates, generally, to dictation and transcription systems, and more particularly, to a disc receiving apparatus which can be utilized as a cartridge holder or as an output hopper, if a cartridge is not utilized, thereby, approximately, doubling disc storage capacity.

2. Description of the Prior Art

Heretofore, various types of dictation and transcription systems have been designed utilizing for information processing belts, tapes and discs. However, the primary effort has been in connection with tapes, and particularly, with the development of self-contained cartridges or cassettes. Cassettes provide a measure of convenience in storing, loading and unloading the record media. In addition, another important advantage of a self-contained cartridge or cassette is that an operator does not have to handle the record media, thereby affording protection to the record media against fingerprints, dirt, or other substances that would be dilatorious to the record media. As aforesaid, as far as can be determined, the primary effort in development of dictation and transcription systems have been in the cartridge or cassette area. These efforts, as far as can be determined have not been extended to disc recording and transcribing systems.

Notwithstanding, it is believed that dictation and transcription systems utilizing discs, and in particularly, the disc, itself, is superior to the aforementioned cassette systems and cassettes in general. For example, discs are cheaper and easier to handle. Also, discs can easily be transported using a standard envelope via the U.S. mailing system. The disc utilized in conjunction with the instant invention is disclosed in U.S. Pat. No. 3,797,035, filed June 23, 1971 by Ronald E. Hunt, et al, entitled "Recording Media Orientation," and assigned to the same assignee as this application. The aforementioned discs can record about 6 minutes of dictation. Moreover, it has been ascertained that six minutes of dictation is sufficient to cover at least 95% of the situations where business letters are the format, i.e., one letter per disc.

A dictation and transcription apparatus utilizing disc as a recording media is disclosed in U.S. Pat. No. 3,789,160, filed Dec. 20, 1971, by James D. Bruer, et al, entitled "Dictation Apparatus with Disc Loading, Feeding and Ejecting Feature," and assigned to the same assignee as this application. The system discloses an apparatus for accommodating a plurality of standard disc cartridges at a load station enabling convenient manual loading by an operator of the apparatus. Following the loading of the discs into the apparatus, the cartridge is thereupon moved to an eject (unload) station which serves to receive the discs, one by one, as they are processed in the apparatus.

Although, the aforementioned apparatus provides improvements in convenient and efficient structures for loading, feeding, and ejecting discs, it is apparent that improved structures for disc loading, for example, is necessary. Thus, U.S. Pat. No. 3,823,948, filed Nov. 13, 1972, by William Melchior Jenkins, entitled "Disc Unloading Apparatus," and assigned to the same assignee as this application, discloses an apparatus for unloading discs from a disc cartridge when the cartridge is inserted into an intake hopper or a loading station of the type described in U.S. Pat. No. 3,789,160 to Bruer et al, aforementioned. By incorporating the unloading apparatus, aforementioned, into the intake hopper of a dictation or transcription apparatus, as disclosed in U.S. Pat. No. 3,789,160 to Bruer et al, enables discs to be removed from a cartridge and properly positioned in a time saving efficient manner.

As further background information, U.S. Pat. No. 3,854,784, filed Nov. 29, 1972, by Ronald Eugene Hunt et al, entitled "Information Media Handling System," having the same inventive entities and the same assignee as the instant application, discloses a cartridge and a hopper adopted to receive the cartridge, the improvement over the prior art being means to push to latch, push to unlatch the cartridge in the hopper. Although, the push to latch, push to unlatch feature of the aforementioned reference is utilized in combination in the instant invention, it should be noted that no other aspect of the instant invention is disclosed therein.

As still further background information, an apparatus for receiving and storing a number of record members (discs), and adopted to have record members unloaded therefrom is disclosed in U.S. Pat. No. 3,860,248, filed Apr. 20, 1973, by Ronald E. Hunt et al, entitled "Record Member Apparatus," having the same inventive entities and the same assignee as the instant application. The apparatus disclosed is a cartridge that can be used in conjunction with the instant invention.

The state of the prior are as indicated hereinabove, includes many advances in disc dictation and transcription apparatus including improvements in input hopper, output hopper, and cartridge systems. However, insofar as can be determined, no prior art output hopper or station incorporates the features and advantages of the instant invention.

OBJECTS OF THE INVENTION

Accordingly, a principle object of the present invention is to provide a disc receiving apparatus in modular form.

Another important object of the invention is to provide a disc receiving apparatus that functions as a cartridge holder or an output hopper, thereby doubling the disc storage capacity.

Still another important object of the present invention is to eliminate operator error by having interlock means which prevent jamming of the apparatus if a cartridge is not fully inserted therein.

Another object of the present invention is to activate by cartridge insertion, indicating means and switching means, thereby providing a visual indication of the number of discs in the cartridge and enabling sensing to associated dictation or transcription systems to automatically eject discs in the aforesaid cartridge in a reliable manner.

Another object of the invention is to prevent jamming of the apparatus when used as an output hopper through forcing a subsequently ejected disc out of the front of said hopper, so that an operator can observe that the apparatus has been filled.

Still another important object of the invention, when the apparatus is used as an output hopper, is to project the ejected discs towards the front of the hopper so that they can be easily removed by an operator.

Another object of the present invention is to minimize screws, clamps, and clips for ease of assembly.

Another object of the present invention is to provide a modular disc receiving apparatus with form adjustments rather than screw adjustments, thereby simplifying maintenance of the apparatus.

Another object of the present invention is to provide a complete disc receiving apparatus that plugs into an existing dictation or transcription apparatus with a minimal of mechanical and electrical connections, thereby affording easy replacement of a malfunctioning module.

SUMMARY OF THE INVENTION

In accordance with these and other objects and features of the present invention, a disc receiving apparatus is disclosed wherein the aforesaid apparatus is utilized as a cartridge holder or an output hopper.

When the apparatus of the instant invention is utilized as a cartridge holder, a cartridge is inserted into the apparatus guided by a throat surface. The ejected discs are stored in the cartridge and counted by a disc counter feeler which depicts, by means of indicator, the approximate number of discs stored in the cartridge. To continue, the cartridge, after being inserted through the access hole of the apparatus, is latched into place by a cartridge latch member. The cartridge latch member is cammed to the left by the cartridge as it is being inserted and is detented into the bottom of the cartridge. When the cartridge is completely inserted, the cartridge latch is spring loaded to the right and into an incline surface molded in the bottom of the cartridge. The aforesaid incline surface enables the cartridge to be removed by an operator by a second forward motion on the cartridge, i.e., push to latch, push to unlatch action.

Also, magnetic means cooperating with a reed switch functions with a cartridge insertion and a cartridge release so that when a cartridge is not inserted, the reed switch is opened, and when a cartridge is fully inserted, and the apparatus is interlocked, the magnet means is positioned so that the reed switch is closed, thereby providing enabling information to a dictation or transcription system to start the ejection of discs into the inserted cartridge. As aforementioned, the indicator means which depicts the approximate number of discs in the cartridge also cooperates with the aforesaid magnet means positioning it in a position which opens the reed switch when the cartridge is full. Accordingly, the reed switch opening provides disabling information to an associated dictation or transcription system which stops the ejection of discs into the cartridge, thereby preventing jamming of the apparatus of the instant invention.

On the other hand, when the apparatus of the instant invention is utilized as an output hopper for receiving ejected discs, the disc storage capacity is increased to approximately 50 discs, i.e., doubled. When utilized in the aforesaid manner, a selection lever is positioned to the left hand position. Thus, the magnet means is moved to a position over the reed switch which closes it providing enabling sensing to an associated dictation or transcription system, which readies said associated system for disc ejection into the apparatus. It should be noted, that the indicator means is inoperative when the apparatus of the instant invention is utilized in the aforesaid manner.

To continue, discs ejected into the hopper contact a disc stop, thereby propelling the discs toward the front of the apparatus where they rest tangent to an inner surface of the aforementioned selection lever. Thus, discs ejected are neatly stacked and protrude from the front of the apparatus where they can be easily removed by an operator. After approximately 50 discs are stacked into the apparatus, the first disc thereafter, ejected into the output hopper, will protrude further out of the front of the apparatus where it will rest on the top surface of the selection lever, thereby giving a visual indication to an operator that the apparatus is full. On the other hand, if an operator is not present, the apparatus will not jam.

The foregoing and other objects, features and advantages of the invention will be apparent from the following more particular description of the preferred embodiments of the invention as illustrated in the accompanying drawings.

DESCRIPTION OF THE PREFERRED EMBODIMENT

Figure 1:
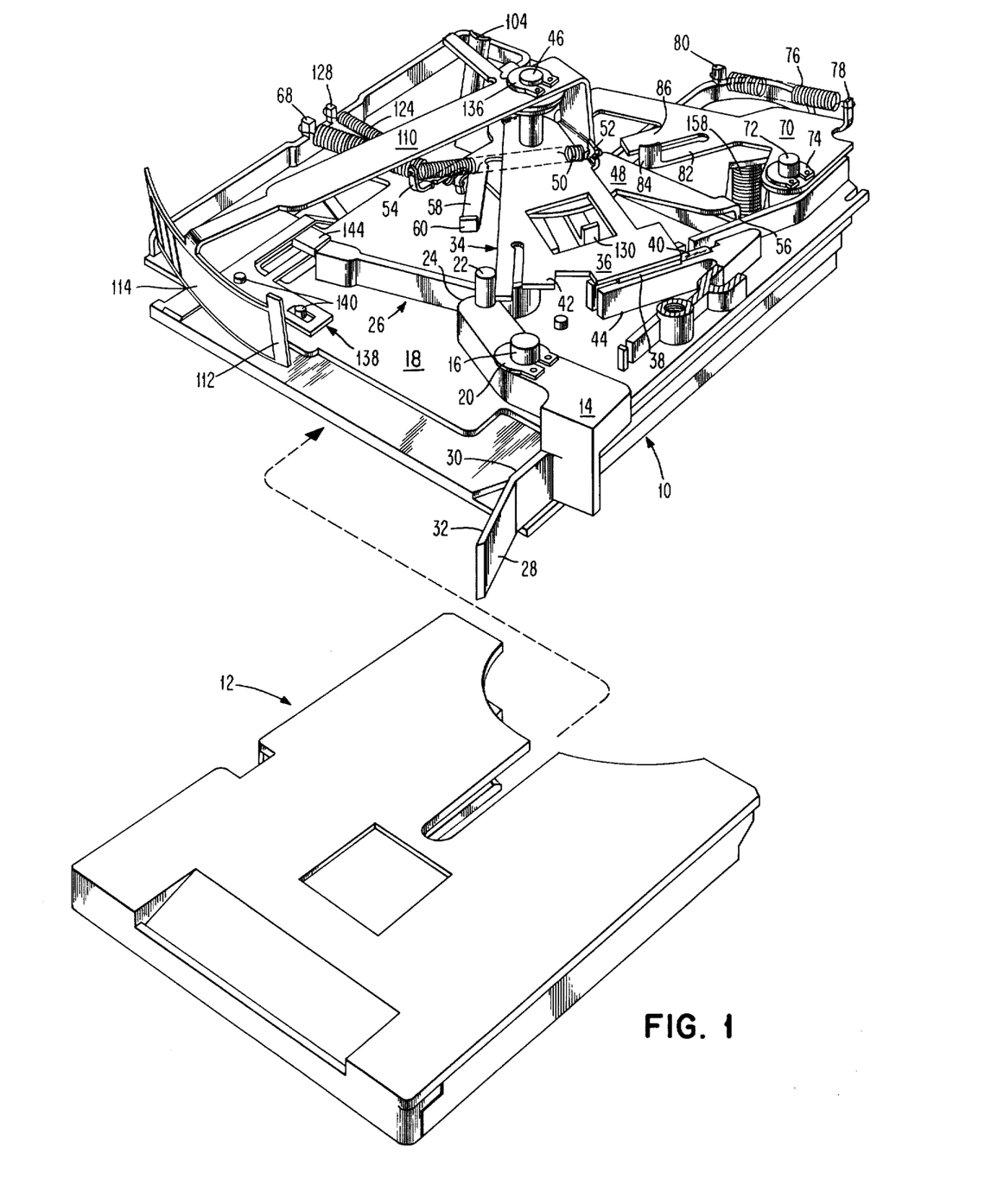
FIG. 1 is a perspective view of the modular disc eject apparatus in the cartridge insertion mode.

FIG. 1 illustrates modular disc ejection apparatus 10 in the proper mode to receive disc cartridge 12. As aforesaid, disc cartridge 12 is an example of a cartridge suitable for use in conjunction with the instant invention and is disclosed in U.S. Pat. No. 3,860,248, filed Apr. 20, 1973 by Ronald E. Hunt et al, entitled "Record Member Apparatus," having the same inventive entities and the same assignee as the instant application.

To continue, selection lever 14 is pivotally connected to selection lever pivot post 16 which is an integral part of top support surface 18 of modular disc eject apparatus 10. Selection lever grip clip 20 secures selection lever 14 to selection lever pivot post 16. Selection lever 14 is operator controlled and selects between modes of operation of modular disc eject apparatus 10, i.e., with or without a cartridge.

Selection lever interlock post 22 cooperates with the edge of interlock surface 34 to rotate magnet support arm 36. Selection lever detent surface 24 is biased by selection lever detent spring 26, an integral part of top support surface 18, allowing selection lever 14 to be detented in two positions, i.e., hopper mode or cartridge mode, as aforementioned. This operation is operator controlled by selection lever finger detent 28.

Figure 10A:
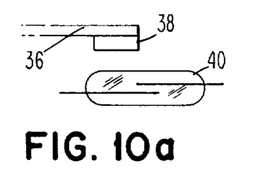
FIGS. 10a through 10c illustrate in schematic form the electrical interlock function of the invention utilizing a magnet-reed switch combination.
Figure 10B:
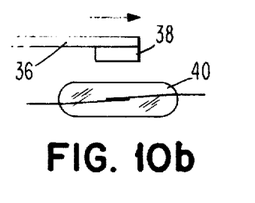

Still referring to FIG. 1, selection lever 14 has thereon disc detent surface 30 to hold discs in the apparatus when a cartridge is not being used. Selection lever cartridge guide surface 32 serves as a throat or guide area for inserting a cartridge 12 into modular disc eject apparatus 10. Reed switch activating magnet 38 is mounted on the under surface of magnet support arm 36 which operates eject interlock reed switch 40. Reed switch 40 is mounted in reed switch holder 44 which is an integral part of top support surface 18. Magnet support form adjustment 42 is utilized to adjust the position of reed switch activating magnet 38 over eject interlock reed switch 40. By referring concurrently to FIG. 1 and FIGS. 10a through 10b, the form adjustment can be visualized. Inserting a tool, such as a screwdriver, between interlock surface 34 and magnet support form adjustment 42, thereby, opening up the aforesaid surfaces allows reed switch activating magnet 38 to move further over eject interlock reed switch 40, i.e., in the direction depicted in FIG. 10. On the other hand, a tool such as a pair of pliers is utilized to close the aforementioned surfaces, thus, limiting the movement of reed switch activating magnet 38. Consequently, the proper form adjustment will result in reed switch activating magnet 38 being positioned over eject interlock reed switch 40 as depicted in FIG. 10b, allowing reed switch closure at the proper position. Also, magnet support arm 36 is pivotally connected to main pivot post 46 which is an integral part of top support surface 18 of modular disc eject apparatus 10.

To continue, cartridge elect lever 48 is operably connected to magnetic support arm 36 by means of magnetic support arm biasing spring 50. Magnetic support arm biasing spring 50 is connected to magnetic support arm spring hook 52 and cartridge eject lever spring hook 54. Cartridge eject lever 48 is also pivotally connected to main pivot post 46. Also, cartridge contacting surface 56 is an integral part of cartridge eject lever 48.

Figure 2:
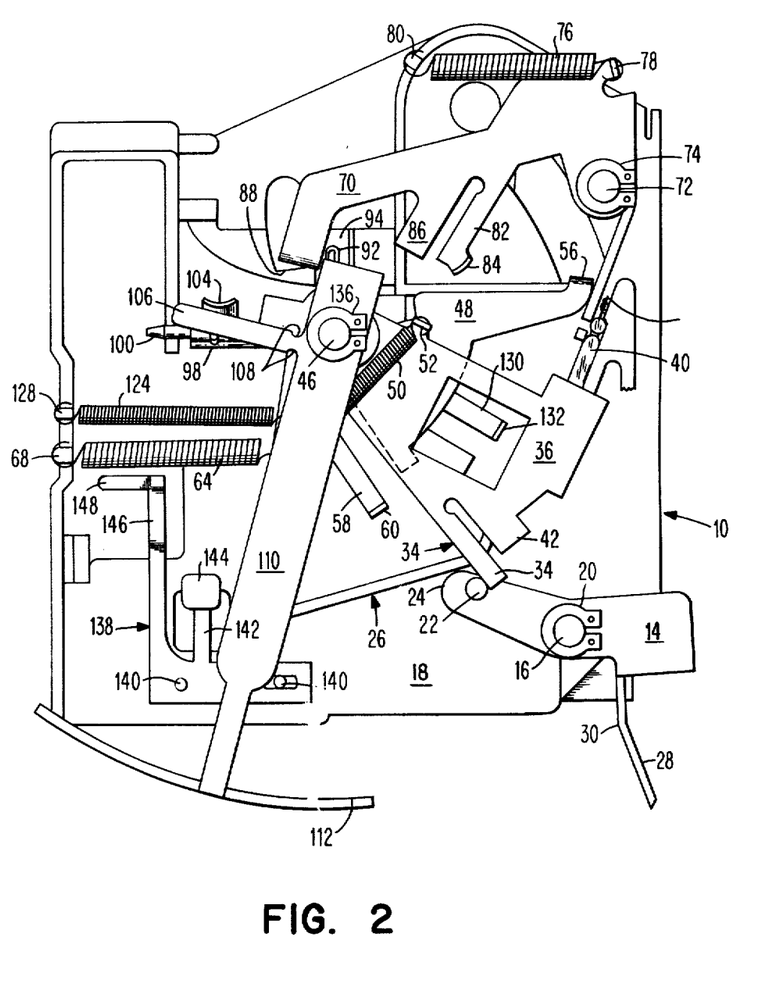
FIG. 2 is a plan view with the apparatus of the instant invention in a cartridge insertion mode to better depict particular elements of the invention.
Figure 5:
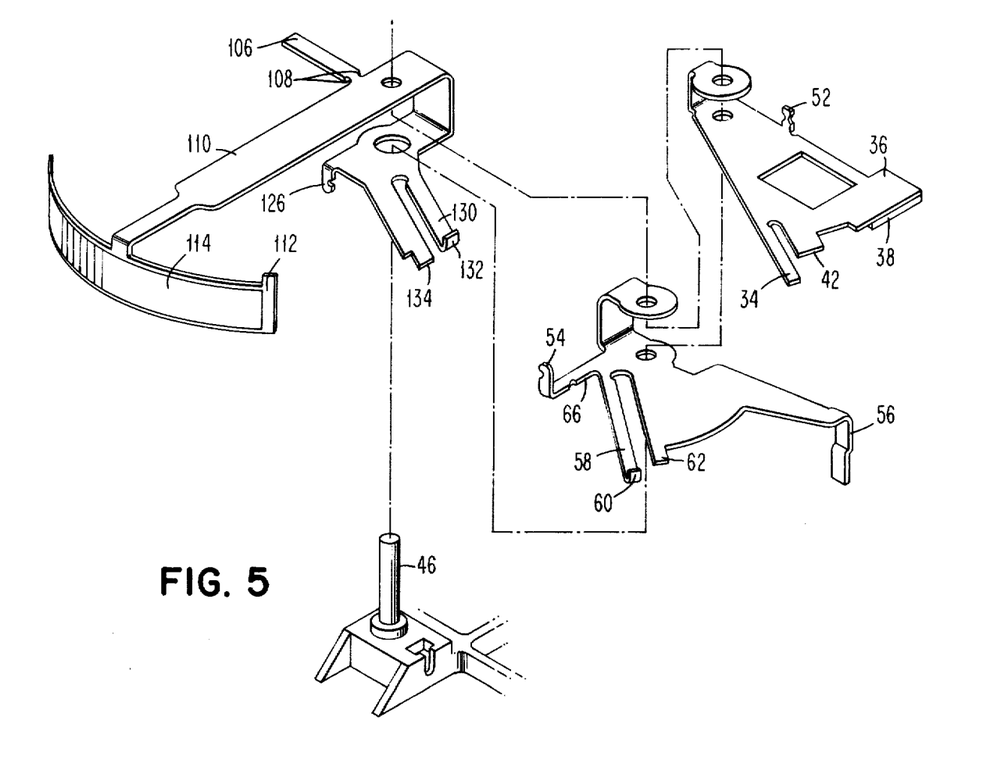
FIG. 5 is an exploded view of particular elements of the invention to illustrate in greater detail their arrangement on the main pivot post.
Figure 6:
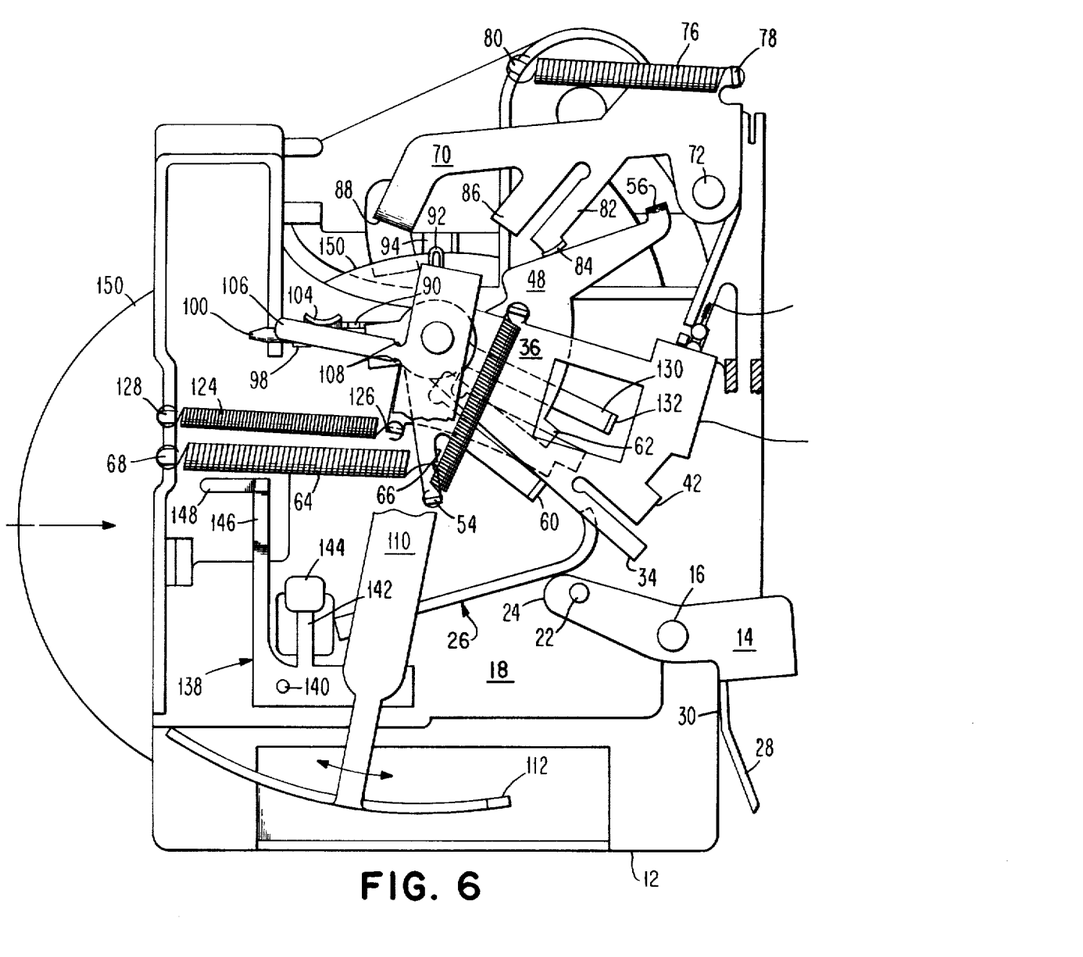
FIG. 6 is a plan view illustrating the change in position of particular elements of the invention with a cartridge fully inserted.
Figure 10C:
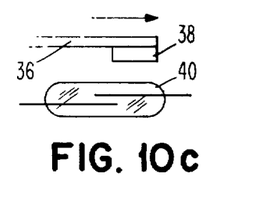

Referring now to FIG. 2 and FIG. 6 concurrently, when cartridge 12 is inserted, the front edge of the cartridge moves cartridge contacting surface 56 forward. Accordingly, cartridge present surface 58, which is an integral part of cartridge eject lever 48, also moves, thus, moving magnet support arm 36 by means of cartridge present tab 60, thereby closing eject interlock reed switch 40. Cartridge present form adjustment 62, better viewable in FIG. 5, is utilized in conjunction with cartridge present surface 58 to adjust for the proper positioning of reed switch activating magnet 38 over eject interlock reed switch 40 when a cartridge is present (see FIG. 10). A restraining force on cartridge eject lever 48 is provided by cartridge eject lever biasing spring 64 which is attached to spring detent surface 66, an integral part of cartridge eject lever 48, and housing spring hook 68.

Still referring to FIGS. 2 and 6 concurrently, disc retaining arm 70 is pivotally connected to disc retaining arm pivot post 72 which is an integral part of top support surface 18. Disc retaining arm grip clip 74 secures disc retaining arm 70 to disc retaining arm pivot post 72. Disc retaining arm 70 is biased by disc retaining arm biasing spring 76 which connects to disc retaining arm spring hook 78 and housing spring hook 80. Integral to disc retaining arm 70 is disc retaining arm surface 82. Integral to disc retaining arm surface 82 is disc retaining arm rotating tab 84 (also refer to FIG. 1). Disc retaining arm form adjustment 86 is utilized in conjunction with disc retaining arm surface 82 to position disc retaining tab 88 (see FIG. 3 for a better view of the aforementioned tab). Disc retaining arm tab 88 serves as a back stop for ejected discs when a cartridge is utilized forcing the discs to the rear of the cartridge. It also serves as a back stop that projects the discs forward up against and tangent to selection lever detent surface 30 when modular disc eject apparatus 10 is being utilized as an output hopper (refer to FIG. 11). The aforementioned functions will be explained hereinafter in the "Statement of the Operation."

Figure 3:
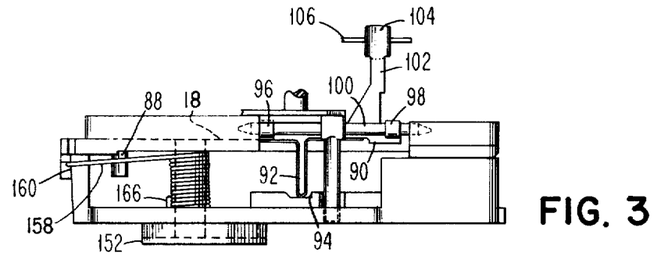
FIG. 3 is a rear view of the apparatus illustrating particular elements of the invention.

Referring now to FIG. 3, disc counter feeler support 90 is pivotally connected by means of pivot holders 96 and 98 to disc counter feeler pivot shaft 100. Disc counter feeler pivot shaft 100 is press-fitted into ridges of top surface 18 for support. Disc counter feeler 92 is depicted in FIG. 3 positioned in disc counter feeler recess 94. Disc counter feeler recess 94 will be explained more fully in the "Statement of the Operation," hereinafter.

Disc indicator activating arm 102 is an integral part of disc counter feeler support 90 and, accordingly, disc indicator activating arm tab 104 cooperates with indicator rotation arm 106 to rotate indicator support arm 110, better depicted in FIG. 1 and FIG. 2, for example. Briefly referring again to FIG. 2, indicator rotation arm 106 has thereon, indicator rotation arm detents 108 for form adjusting the aforesaid arm. Now briefly referring to FIG. 5, indicator rotation arm 106 is made adjustable by means of indicator rotation arm detent 108 in order to position background indicia 114 in the window of the front cover of an associated dictation or transcription apparatus (not shown). Still referring to FIG. 5, indicator surface 112 is attached to indicator support arm 110 and, accordingly, rotates therewith.

Figure 4:
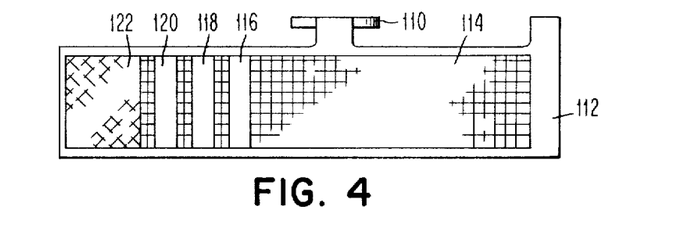
FIG. 4 is a front view of the indicator surface of the invention depicting disc capacity indicia.

To continue, FIG. 4 illustrates a front view of indicator surface 112. Shown thereon, as aforementioned, is background indicia 114, which for example can be black in color. Also depicted is first disc indicia 116, half-full indicia 118, three-fourths indicia 120, and full indicia 122. For example, indicia 116, 118, and 120 can be white in color and indicia 122 can be orange in color.

Referring again to FIG. 5 and FIG. 2, concurrently, indicator support arm 110 is biased by means of indicator support arm biasing spring 124 which is attached at one end to indicator support arm spring hook 126 and housing spring hook 128. Also, indicator full capacity arm 130 having indicator full capacity tab 132 integral thereto, rotates with indicator support arm 110 which is pivotally connected to main pivot post 46. Indicator full capacity form adjustment 134 is the means utilized to position indicator full capacity tab 132 which cooperates with magnet support arm 36 to operate on eject interlock reed switch 40 as depicted in FIG. 10. Still referring to FIG. 5 and FIG. 2, indicator support arm 110 is pivotally connected to main pivot post 46 and secured thereon by main pivot post grip clip 136.

Figure 7:
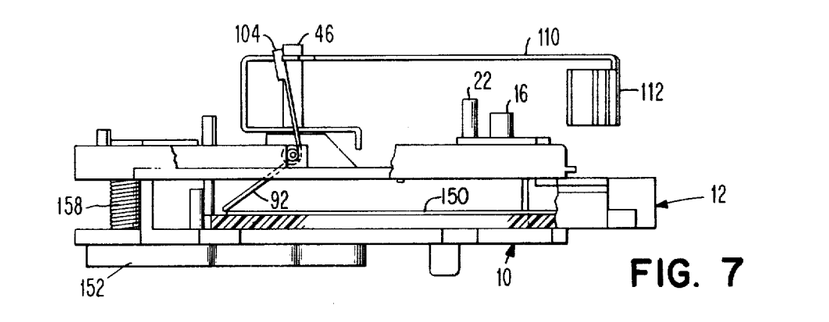
FIG. 7 is a side sectional view illustrating a disc being counted.
Figure 11:
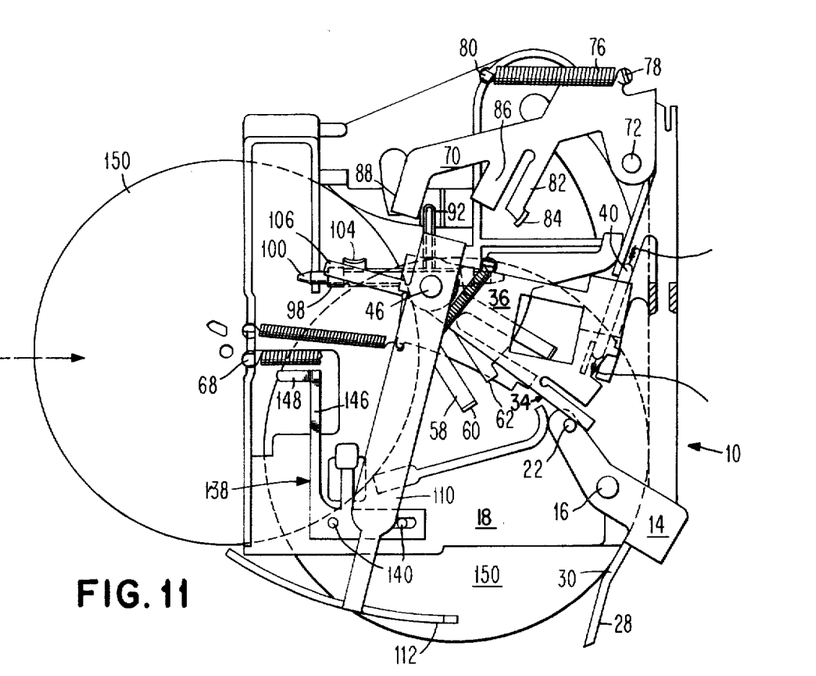
FIG. 11 illustrates the invention being utilized as an output hopper depicting the positions of particular elements in this mode relative to the cartridge mode depicted in FIG. 6.

Viewing FIG. 6, FIG. 7 and FIG. 11 concurrently, disc stacking spring 138 is attached to top support surface 18 by stacking spring fasteners 140. Additional support is provided for disc stacking spring 138 by stacking spring holder lever 142 being recessed under restraining protrusion 144 which is an integral part of top support surface 18. To continue, disc stacking spring 138 further comprises cantilever arm 146 and disc camming surface 148. The primary purpose of disc stacking spring 138 is to deflect a disc down, in the mode of operation when a cartridge is not used, thereby maintaining a bias on the disc stack as discs are continually ejected into the apparatus (see FIG. 12).

Figure 8:
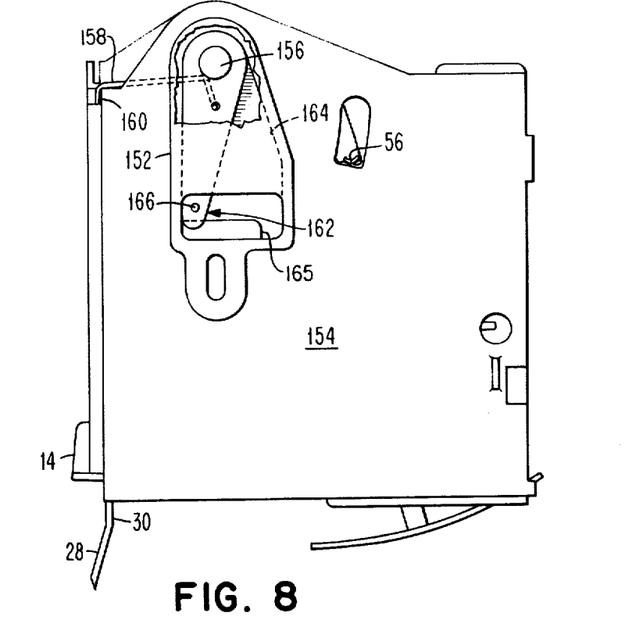
FIG. 8 is a bottom view of the apparatus illustrating in greater detail particular elements of the invention.

Referring to FIG. 8 and FIG. 3, concurrently, latching mechanism cavity 152 is an integral part of bottom support surface 154. Latching arm pivot post 156, having latching arm biasing spring 158 thereon, is attached to top support surface 18 and latching mechanism cavity 152 (see FIG. 3). Also, latching arm biasing spring 158 is connected to bottom support surface wall 160 and latching arm 162. The torsion force of latching arm biasing spring 158 forces latching arm 162 against latching mechanism cavity wall 164, thereby providing a horizontal force vector. In addition, latching arm biasing spring 158 provides a compression force, i.e., a vertical force vector, thereby restraining latching arm 162 against latching arm restraining ledge 165. Integral to latching arm 162 is cartridge latching pin 166.

A latching mechanism similar to the aforementioned mechanism is disclosed in U.S. Pat. No. 3,854,784, filed Nov. 29, 1972, by Ronald Eugene Hunt et al, entitled "Information Media Handling System," having the same inventive entities and assignee as the instant application.

STATEMENT OF THE OPERATION

The modular disc eject apparatus of the instant invention has two modes of operation. It is utilized as an output hopper for receiving discs, or it is utilized as a cartridge holder whereby discs are ejected into the cartridge and counted. As aforementioned, in the "Background of the Invention," a disc suitable for utilization in the instant invention is disclosed in U.S. Pat. No. 3,797,035, filed June 23, 1971 by Ronald E. Hunt et al, entitled "Recording Media Orientation," and assigned to the same assignee as this application. A dictation and transcription system that can utilize the instant invention is disclosed in U.S. Pat. No. 3,789,160, filed Dec. 20, 1971, by James D. Bruer et al, entitled "Dictation Apparatus with Disc Loading, Feeding and Ejecting Feature," and assigned to the same assignee as this application. In addition, an improved feeding and ejecting apparatus that is suitable for use with the instant invention is disclosed in application, Ser. No. 559352, filed concurrently herewith by James D. Bruer, entitled "Loader Carrier Mechanism," and assigned to the same assignee as this application. Other pertinent references have been cited hereinbefore in the "Description of the Preferred Embodiment."

1. Cartridge Holder Operation

Details of the operation according to this aspect of the invention, is explained in conjunction with FIGS. 2, 3, 4, 6, 7, 8, 9 and 10.

FIG. 2 depicts the apparatus of the instant invention readied for insertion of a cartridge. Selection lever 14 is positioned to the right as shown. Accordingly, magnet support arm 36 and reed switch activating magnet 38, attached thereto, is positioned over eject interlock reed switch 40 as depicted in FIG. 2, and shown in FIG. 10a. Consequently, an enabling sensing that will allow discs to be ejected is not transferred via reed switch 40 to associated dictation or transcription systems. Still referring to FIG. 2, indicator surface 112 is biased to the left by indicator support arm biasing spring 124 as depicted. Also, disc counter feeler 92 is positioned in disc counter feeler recess 94, as better depicted in FIG. 3.

FIG. 6 illustrates a cartridge 12 fully inserted and latched into position to receive discs. As shown, a disc 150 has been ejected into cartridge 12 and under disc counter feeler 92. With the insertion of a single disc, as shown in FIG. 6 and better viewed in FIG. 7, disc counter feeler 92 has pivoted out of disc counter feeler recess 94 (see FIG. 3) thereby cooperating with disc indicator activating arm tab 104 and indicator rotation arm 106 to rotate indicator surface 112 to the right. It should be noted that the insertion of the first disc rotates indicator surface 112 further to the right than a subsequent disc due to the distance of travel of disc counter feeler 92 out of disc counter feeler recess 94 to the top surface of a first disc 150. Thus, as depicted in FIG. 4, first disc indicia 116 is viewable in a window of a transcription or dictation system (not shown.)

Still referring to FIG. 6, the front edge of cartridge 12 has contacted cartridge contacting surface 56. Accordingly, cartridge present tab 60 rotates against the edge of magnet support arm 36 positioning reed switch activating magnet 38 into a position over eject interlock reed switch 40 as depicted in FIG. 10b. Thus, an enabling sensing is available to an associated dictation or transcription system allowing disc ejection into cartridge 12 as depicted in FIG. 6.

Still referring to FIG. 6, as aforementioned, cartridge eject lever 48 is rotated when a cartridge is inserted, thereby cooperating with disc retaining arm 70 via disc retaining arm rotating tab 84 moving disc retaining tab 88 (better viewed in FIG. 3) to the position depicted in FIG. 6. Consequently, disc retaining tab 88, in the position depicted, serves as a back stop for inserted discs.

To continue, the first disc insertion causes a large rotation of indicator surface 112 causing background indicia 114 to rotate out of a window (not shown), thus, causing first disc indicia 116 to appear in the window. Insertion of a subsequent disc into the apparatus will cause a relatively smaller motion then caused by the first disc. All subsequent discs will cause a linear motion and rotation of indicator support arm 110, and, accordingly, indicator surface 112.

Referring to FIG. 6 and FIG. 4 concurrently, indicator support arm 110 continues to rotate counterclockwise by the insertion of subsequent discs into cartridge 12. This process continues until full indicia 122 appears in the window of an associated dictation or transcription system. As indicator support arm 110 continues to rotate counterclockwise, indicator support arm biasing spring 124 is extended, and as full capacity is approached, indicator full capacity tab 132 cooperates with magnetic support arm 36 to position reed switch activating magnet 38 as shown in FIG. 10b. Thus, disabling sensing is provided to an associated dictation or transcription system, thereby, discontinuing the ejection of discs into the cartridge. When cartridge 12 is pushed to unlatch and removed from modular disc eject apparatus 10, the biasing springs, depicted in FIG. 6 operate to restore the various elements of the invention into the position depicted in FIG. 2.

Figure 9A:
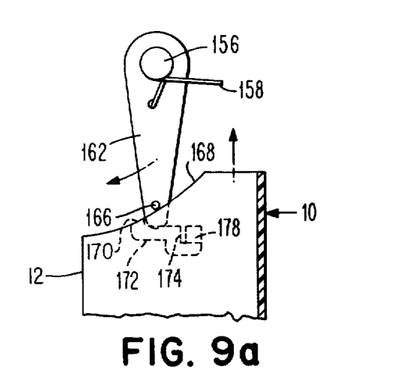
FIGS. 9a through 9c illustrate the push to latch, push to unlatch operation of the apparatus according to the invention.
Figure 9B:
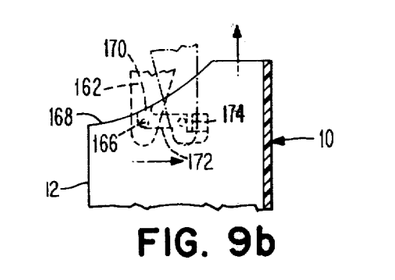
Figure 9C:
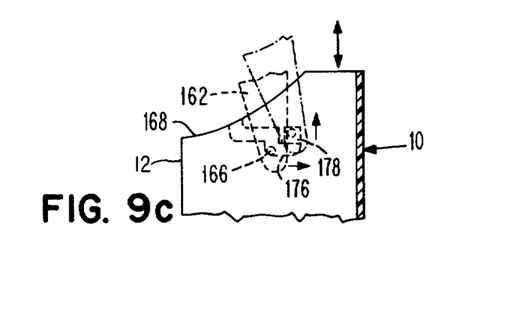

The push to latch, push to unlatch feature of the apparatus is explained in conjunction with FIGS. 9a through 9c. Referring first to FIG. 9a, as cartridge 12 is inserted, cartridge front ramp surface 168 contacts cartridge latching pin 166 and rotates latching arm 162 clockwise. Accordingly, cartridge latching pin 166 follows along cartridge front ramp surface 168 until it approaches cartridge slot 170.

Referring now to FIG. 9b, cartridge latching pin 166 is shown in cartridge slot 170 due to a continual forward motion on cartridge 12. Thus, cartridge latching pin 166 rotates against cartridge surface 172. Cartridge latching pin 166 is still being biased counterclockwise by latching arm biasing spring 158 depicted in FIG. 9a. Accordingly, a continuous forward motion will force cartridge latching pin 166 against cartridge wall 174 latching the cartridge into the apparatus.

Referring to FIG. 9c, cartridge 12 is unlatched by a forward motion, which forces cartridge latching pin 166 against wall 176. Since cartridge latching arm 162 is still being biased counterclockwise by latching biasing spring 158, previously described, cartridge latching pin 166 moves along wall 176 and up ramp 178, the releasing force being provided by cartridge eject lever 48 via the restraining force of cartridge eject lever biasing spring 64, previously described, and shown in FIG. 6.

2. Output Hopper Operation

Details of the operation according to this aspect of the invention, is explained in conjunction with FIGS. 11, 10, 3 and 12.

Referring to FIG. 11, initially, selection lever 14 is rotated clockwise or to the left as shown. When selection lever 14 is in the aforementioned position, selection lever interlock post 22 cooperates with the edge of interlock surface 34 rotating magnet support arm 36, and consequently, reed switch activating magnet 38 into the position shown in FIG. 10b. Accordingly, an enabling sensing is provided to an associated dictation or transcription system allowing discs to be ejected into apparatus as shown. As the first disc is ejected into the apparatus, it contacts disc camming surface 148 of disc stacking spring 138. Accordingly, the disc is projected downward where it contacts disc retaining tab 88, better viewable in FIG. 3. This operation prevents the disc from going under disc counter feeler 92, also better viewable in FIG. 3. Consequently, the disc is forced toward the front of the apparatus until it becomes tangent to selection lever disc detent surface 30 where it comes to rest.

Figure 12:
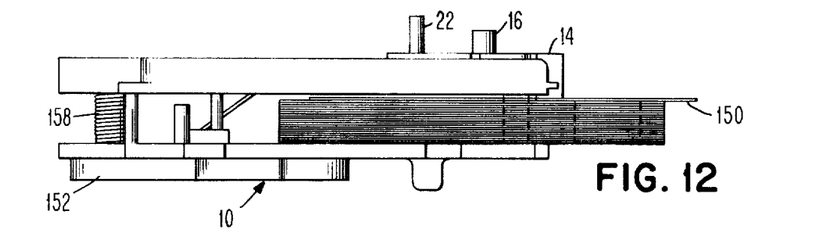
FIG. 12 is a side view of the invention depicting one output hopper full condition when the invention is utilized as depicted in FIG. 11.

As subsequent discs are ejected into the apparatus, the stacking process, as aforementioned, is continued. Referring now to FIG. 12, the hopper is full as depicted. When approximately 50 discs are stacked in the apparatus, the 51st disc is projected out over the top of disc detent surface 30, as depicted in FIG. 12. A subsequent disc ejected into the hopper will force the aforementioned disc out of the apparatus, thus, preventing jamming.

While the invention has been particularly described with reference to the preferred embodiments thereof, it will be understood by those skilled in the art, that various changes in form and detail may be made therein without departing from the spirit and scope of the invention.

What is claimed is:

1. Apparatus for holding a cartridge for receiving ejected discs therein for use in an associated transcription or dictation system comprising in combination:

a modular structure comprising a top support surface, and a bottom support surface having at least one wall integral thereto attached to said top support surface, thereby forming a front entry throat for said cartridge, and a side entry throat allowing said ejected discs to be received in said cartridge;

cartridge eject lever means pivotally connected to a main pivot post integral to said top support surface, a front surface of said cartridge cooperating with said cartridge eject lever means after entry into said modular structure, causing rotation thereof;

magnet support means pivotally connected to said main pivot post, said cartridge eject lever means cooperating with said magnetic support arm causing rotation thereof;

an eject interlock reed switch secured to said top support surface of said modular structure, said reed switch disposed so as to be closed by said rotation of said magnetic support means when said cartridge is latched into said modular structure, whereby an enabling sensing is provided to said associated transcription or dictation system;

disc counter means pivotally connected to said top support surface, said disc counter means being rotated by said ejected discs entering said cartridge; disc capacity indicator means pivotally connected to said main pivot post and operably connected to said disc counter means being rotated thereby, for providing a visual indication of the number of discs in said cartridge, and for cooperating with said magnetic support means causing rotation thereof, whereby said reed switch is opened when full disc capacity of said cartridge is obtained, thereby providing a disabling sensing to said associated transcription or dictation system inhibiting the ejection of said discs into said cartridge thereby preventing jamming of said apparatus; and push to latch, push to unlatch means pivotally connected to said bottom support surface, said push to latch, push to unlatch means cooperating with a front bottom surface of said cartridge during entry thereof thereby latching said cartridge into position to receive said ejected discs, said push to latch, push to unlatch means and said cartridge eject lever cooperating with said cartridge during a subsequent push motion thereby unlatching and ejecting said cartridge.

2. An output hopper for receiving ejected discs therein for use in an associated transcription or dictation system comprising in combination:

a modular structure comprising a top support surface, and a bottom support surface having at least one wall integral thereto attached to said top support surface, thereby forming a front exit throat for said ejected discs, and a side entry throat allowing said ejected discs to be received therein;

magnet support means pivotally connected to a main pivot post integral to said top support surface;

selection means pivotally connected to said top support surface for rotating said magnet support means;

a reed switch secured to said top support surface, disposed so as to be closed by said rotation of said magnet support means, whereby an enabling sensing is provided to said associated transcription or dictation system;

disc spring camming means secured to said top support surface and disposed through an opening on said top support surface so as to project said ejected discs toward said bottom support surface; and disc retaining means secured to said top support surface disposed so as to project said ejected disc toward said exit throat where said discs rest against a disc detent surface of said selection means; whereby ejected discs are stacked by said disc spring camming means against said disc detent surface of said selection means until said output hopper reaches full capacity at which time a subsequent ejected disc is projected over the top of said disc detent surface thereby preventing jamming of said output hopper.

* * * * *

UNITED STATES PATENT AND TRADEMARK OFFICE
CERTIFICATE OF CORRECTION

PATENT NO. : 3,940,147
DATED : February 24, 1976
INVENTOR(S) : Ronald Eugene Hunt and William Melchior Jenkins It is certified that error appears in the above-identified patent and that said Letters Patent are hereby corrected as shown below:

In the Abstract, line 9, "enabling" should read --disenabling--.

Signed and Sealed this

Twenty-first Day of September 1976

[SEAL]

Attest:

RUTH C. MASON
*Attesting Officer*

C. MARSHALL DANN
*Commissioner of Patents and Trademarks*